United States Patent [19]

Philpott et al.

[11] 4,295,391
[45] Oct. 20, 1981

[54] TRANSMISSION ASSEMBLY

[75] Inventors: Arthur Philpott, Little Eaton; Reginald S. Fuher, Alvaston, both of England

[73] Assignee: Ready Pen Limited, Derby, England

[21] Appl. No.: 43,234

[22] Filed: May 29, 1979

[30] Foreign Application Priority Data

May 30, 1978 [GB] United Kingdom ............... 24160/78

[51] Int. Cl.³ .......................... F16H 3/00; F16H 57/10
[52] U.S. Cl. ........................................ 74/782; 74/675; 74/411.5; 74/793; 474/72
[58] Field of Search ............. 74/782, 793, 794, 217 C, 74/217 CV, 404, 411.5, 674, 705; 474/72

[56] References Cited

U.S. PATENT DOCUMENTS

| | | | |
|---|---|---|---|
| 2,210,598 | 8/1940 | Pepper et al. | 74/782 |
| 3,842,685 | 10/1974 | Philpott et al. | 74/217 C |
| 3,861,484 | 1/1975 | Joslin | 74/675 X |
| 3,885,656 | 5/1975 | Michling et al. | 74/411.5 X |
| 3,899,941 | 8/1975 | Cook | 74/782 X |
| 3,924,490 | 12/1975 | Mills | 74/782 X |
| 4,048,871 | 9/1977 | Fyock | 74/793 X |
| 4,192,203 | 3/1980 | Dailey | 74/793 X |

FOREIGN PATENT DOCUMENTS

| | | | |
|---|---|---|---|
| 509892 | 3/1952 | Belgium | 74/794 |
| 466665 | 10/1928 | Fed. Rep. of Germany | 74/783 |
| 2654360 | 6/1979 | Fed. Rep. of Germany | 74/793 |
| 58330 | 11/1953 | France | 74/782 |
| 434717 | 4/1978 | Italy | 74/782 |
| 1226608 | 3/1972 | United Kingdom | 74/782 |

*Primary Examiner*—George H. Krizmanich
*Attorney, Agent, or Firm*—Larson and Taylor

[57] ABSTRACT

A transmission assembly comprising coaxial input and output shafts. A drive sprocket wheel carrying member is secured to and extends radially from the input shaft. A first sprocket wheel is co-axially mounted on the output shaft and a second sprocket wheel is rotatably mounted on the output shaft. A drive sprocket wheel assembly is rotatably mounted on the sprocket wheel carrying member, and each drive sprocket wheel assembly includes a primary and secondary sprocket wheel. For each drive sprocket wheel assembly, a chain extends about the primary sprocket wheel and the first sprocket wheel and a further chain extends about the second sprocket wheel and the second sprocket wheel. The speed of the rotation of the second sprocket wheel is controlled to control the speed of rotation of the output shaft. A reversal drive provides a step up during connection between the input shaft and the second sprocket wheel by way of a clutch, so that when the clutch is activated the second sprocket wheel is rotated faster than the input shaft to effect reversal of the output shaft.

11 Claims, 8 Drawing Figures

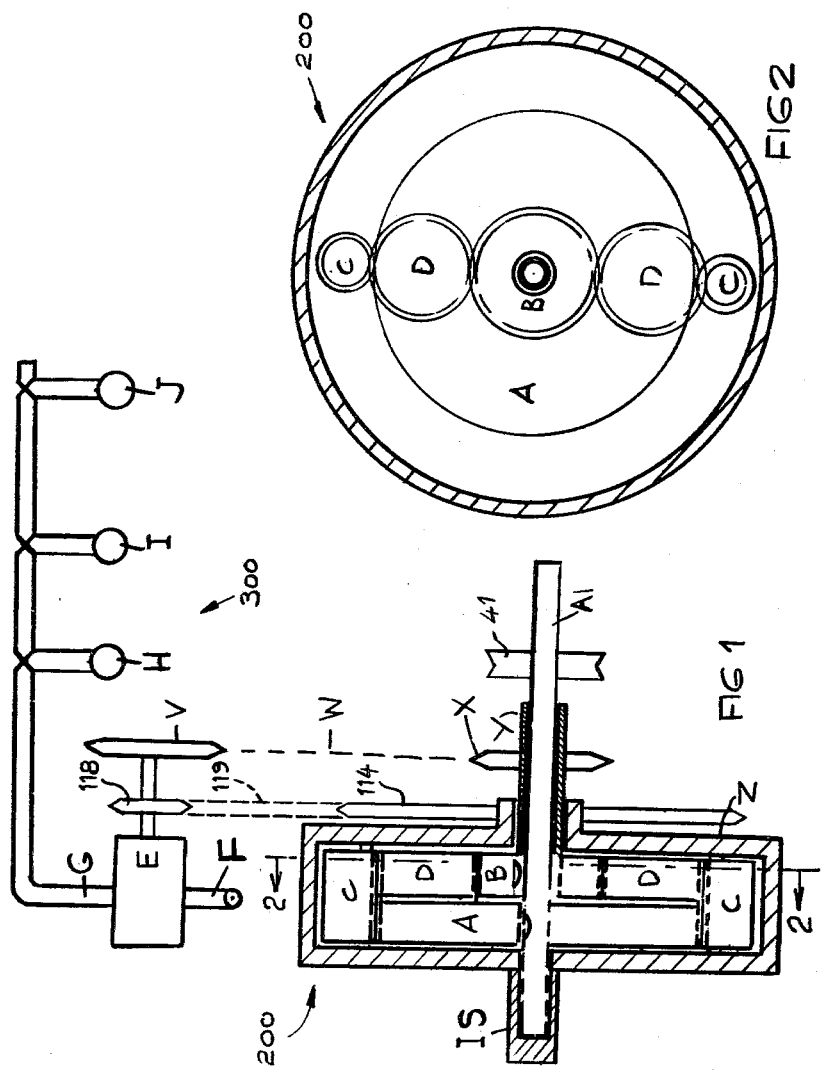

TRANSMISSION ASSEMBLY

The present invention relates to transmission assemblies.

According to one aspect of the present invention there is provided a transmission assembly comprising an input shaft, an output shaft in co-axial alignment with the input shaft, a drive sprocket wheel carrying a member secured to the input shaft and extending generally radially therefrom, a first sprocket wheel co-axially mounted on the output shaft, a second sprocket wheel rotatably mounted on the output shaft, at least one drive sprocket wheel rotatably mounted on the output shaft, at least one drive sprocket wheel assembly rotatably mounted on the sprocket wheel carrying member, each drive sprocket assembly including at least a primary and secondary sprocket wheel, and for each drive wheel sprocket assembly, a chain extending about the primary sprocket wheel and the first sprocket wheel and a further chain extending about the secondary sprocket wheel and the second sprocket wheel, and control means for controlling the speed of the rotation of the second sprocket wheel to control the speed of rotation of the output shaft, and a reversal drive means providing a step up driving connection between the input shaft and said second sprocket wheel via a clutch, so that when said clutch is activated the second sprocket wheel is rotated faster than the input shaft is effect reversal of the output shaft.

According to another aspect of the present invention there is provided a transmission assembly comprising an input shaft, an output shaft in co-axial alignment with the input shaft, a drive gear carrying member secured to the input shaft and extending generally radially therefrom, a first gear co-axially mounted on the output shaft, a second gear rotatably mounted on the output shaft, at least one drive gear assembly rotatably mounted on the gear carrying member each gear assembly providing a driving connection between the first and second gears, control means for controlling the speed of rotation of the second gear to control the speed and rotation of the output shaft and a reversal drive means for providing a step up driving connection between the input shaft and the second gear via a clutch, so that when said clutch is activated the second gear is rotated faster than the input shaft to effect reversal of the output shafts.

Reference is now made to the accompanying drawings, in which:

FIG. 1 is a schematic axial section of an embodiment of the present invention.

FIG. 2 is a schematic, cross sectional view, taken along line 2—2 of FIG. 1.

FIG. 8 is an enlarged diagrammatic view of the pump an pressure fluid circuit of FIG. 1, but modified to include certain additional fluid lines and actuating means relating to the reversal and brake devices.

Figure 3:
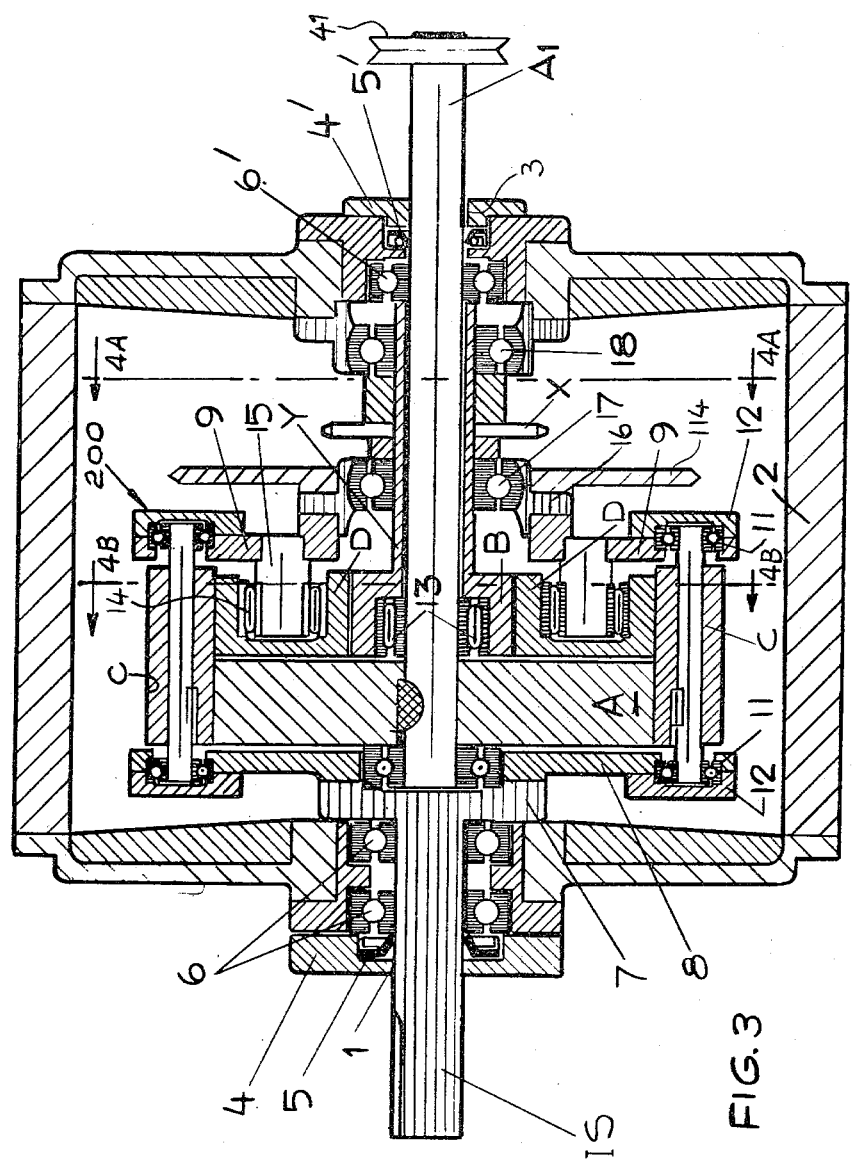
FIG. 3 is an axial section of an embodiment based on the schematic of FIG. 1, but having a different arrangement of the valves.

Referring to the drawings, FIGS. 1 and 2 show schematically a transmission assembly according to the present invention having a transmission unit 200 controlled by a valve means 300. The transmission unit includes a drive shaft IS and a hollow casing 2 connected thereto. The drive shaft and casing are rotatable about the axis of the drive shaft. A first gear wheel A is keyed to an output shaft A1 which is co-axial with the drive shaft IS and rotatably mounted in the casing. A first pair of diametrically opposed drive gears C are rotatably mounted in the casing and arranged to mesh with gear wheel A. A second gear wheel B is keyed to a hollow shaft Y through which the output shaft A1 passes. A pair of diametrically opposed pinions D are each mounted between the gear wheel B and a respective drive gear C. A sprocket wheel X is mounted on the shaft Y by a free wheel/one-way clutch so that only one direction of rotation of the sleeve will drive a rotary hydraulic gear pump E which is used to control rotation of the sleeve Y in a given direction. A drive shaft of the pump is connected to a sprocket wheel V which is connected to sprocket wheel X by a chain W passing around the sprocket wheels. The gear pump E has a suction inlet F and a pressure outlet G which is controlled by the valve means 300 which includes three valves in this embodiment. Valve H is an open/closed solenoid operated valve, valve I is a spring loaded pressure valve and valve J is a hand controlled pressure valve. Valve I includes a regulating mechanism (not shown) which can be used to vary the operating characteristics of the system.

In operation the torque developed in the output shaft A1 may be varied by varying the restraint on rotation of sleeve Y imposed by pump E, for instance if there is no restraint on sleeve Y it may freely rotate and thus output shaft A1 if connected to a load will not rotate. On applying restraint to sleeve Y by restricting output flow from the pump the torque developed in the output shaft A1 is progressively increased as the restraint on sleeve Y is progressively increased.

Consequently, a transmission assembly according to the present invention may be used to wind a roll of material at a constant tension. This may be achieved by connecting input shaft IS to a motor (not shown) and winding the roll of material onto output shaft A1. When the speed of the output shaft A1 starts to drop due to increasing load, gear wheel A then rotates more slowly increasing the speed of rotation of the drive gears C and pinions D and the second gear wheel B in accordance with the differential effect. This in turn causes an increase in pressure across the gear pump E. However this pressure increase is controlled by the setting of the regulating valve I which results in an increase in torque on the second gear wheel B which is transmitted to gear wheel A to allow the peripheral speed of the roll on the output shaft to assume its former value. By varying the setting of valve J at will the speed of the output shaft can be varied.

Referring now to FIG. 3, in which those parts corresponding to those of FIG. 1 have the same references, the input shaft IS extends through a bore 1 at one end of an outer casing 2 and the output shaft A1 extends through a coaxial bore 3 at the other end of the outer casing 2.

Figure 4:
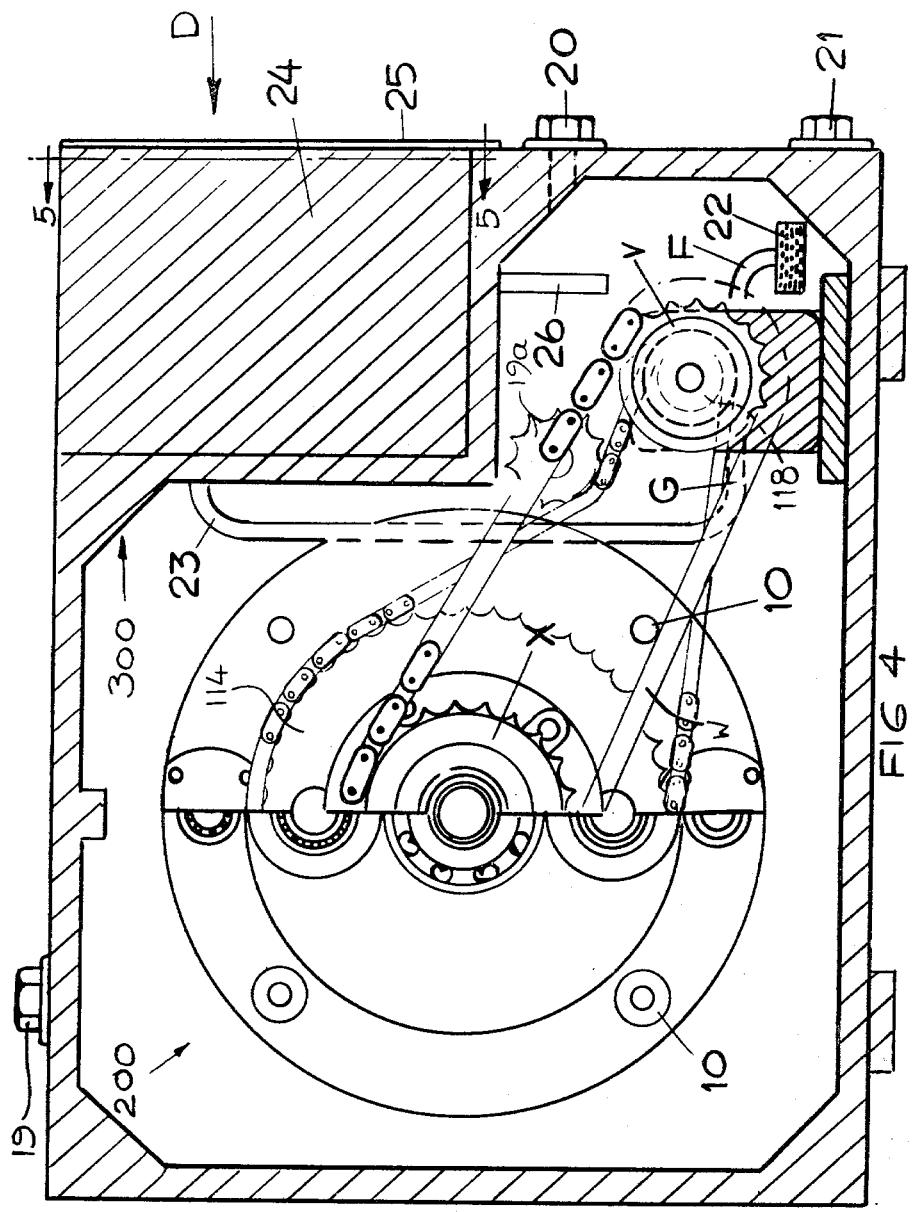
FIG. 4 is a sectional view, the right hand side of which is taken along line 4A—4A of FIG. 3 and the left hand side of which is taken along line 4B—4B of FIG. 3.

Each shaft passes through a cover 4, 4' in which an oil seal 5, 5' is inserted and is supported by bearings 6, 6'. The right hand end of the shaft IS is integral with a flange 7 secured to an annular disc 8 spaced apart from a further annular disc 9 by four bushes 10 (FIG. 4). Elements 8, 9 form a drive gear carrying member. Rotatably mounted between the discs 8, 9 are the two drive gears C which are supported in bearings 11 located between the discs 8, 9 and annular member 12 secured to the discs 8, 9. Gear wheel A meshes with each drive gear C and is keyed to output shaft A1 as described previously. Gear wheel B is rotatably mounted on the shaft A1 by means of needle bearings 13. In this embodiment gear wheel B is integral with the hollow shaft Y but may be keyed thereto as described above. The pinions D are each rotatably mounted between the gear wheel B and a respective drive gear C by means of needle bearings 14 disposed around spindles 15 secured to the disc 9. Disc 9 is secured to an annular member 16 and is rotatable about the hollow shaft Y by means of a bearing 17. Hollow shaft Y is rotatably supported in the casing 2 through bearing 18. The sprocket X is mounted on shaft Y as described above.

Referring now to FIG. 4, the casing 2 is provided with an oil filler plug 19, an oil level plug 20 and an oil drain plug 21 and the casing is normally filled with oil to the level of plug 20. Chain W passes round the sprocket wheel X and the sprocket wheel V which is connected to one of the rotors (not shown) of the pump E as described above. An oil filter 22 is positioned at the suction inlet F of the pump and the pressure outlet G of the pump E is connected through a pipe 23 to the control valves H, I, J (FIG. 5) enclosed in a box 24 having a cover plate 25. An outlet pipe 26 from these valves communicates with the interior of casing 2.

Figure 5:
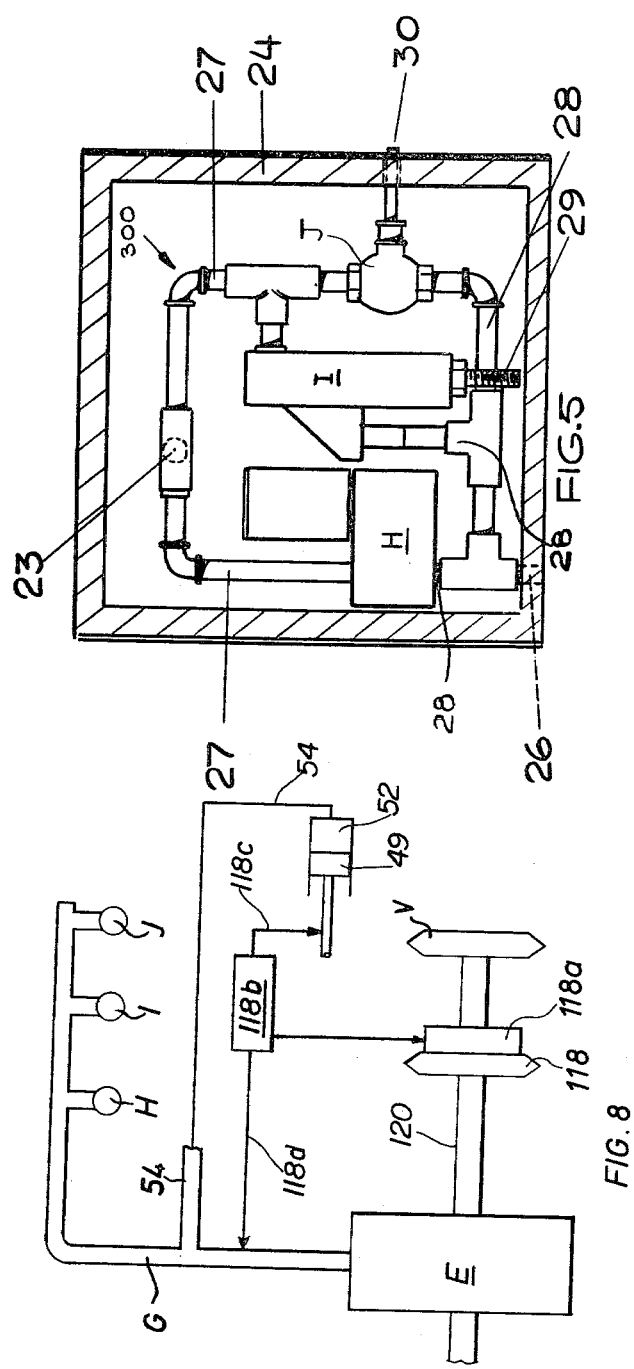
FIG. 5 is a view taken along 5—5 of FIG. 4 and showing the valve means.

Referring now to FIG. 5, the pipe 23 is connected to a conduit 27 which at one end communicates with the solenoid-operated valve H, and at the other end communicates with the spring-loaded pressure valve I and the hand-controlled bleed or bypass valve J through inlets 27 which as shown in FIG. 5 are arranged in parallel. The valves H, I, J have outlets 28 communicating with outlet pipe 26. Valve I has an adjusting screw 29 which would be used to set the operating characteristics of the system. Running adjustments can be made by non-skilled personnel by adjusting screw 30 of valve J. This is arranged to only vary the speed of the shaft by a small amount.

In each of the embodiments described the gear ratio is 4:1 but could be higher if desired, i.e. a rotational output speed four times greater than that of the input speed may be achieved.

It will be appreciated that controls may be provided to use the apparatus according to the invention for variable speed control or intermittent start and stop motions in place of conventional clutch and brake systems. Provided the hydraulic fluid is maintained in a clean condition, wear and maintenance is virtually nil.

The present invention has been found to be particularly efficacious in the winding of polythene film or other delicate materials in that the material can be wound with substantially constant tension.

As an alternative to the transmission units described above the transmission unit may be constructed in a similar manner to those disclosed in out U.S. Pat. No. 3,842,685. Reference should be made to this patent for details of these transmission units. Analogizing the transmission shown therein to the transmission shown herein; gear A would be the first sprocket wheel, assembly C would be the drive sprocket wheel assembly, the left side of C being the primary sprocket wheel and the right side of C being the secondary sprocket wheel, gear B would be the second sprocket wheel, and elements 8, 9 would be the drive sprocket wheel carrying member. Also as shown is that transmission chains connect the primary sprocket wheel to the first sprocket wheel and the secondary sprocket wheel to the second sprocket wheel.

Figure 6:
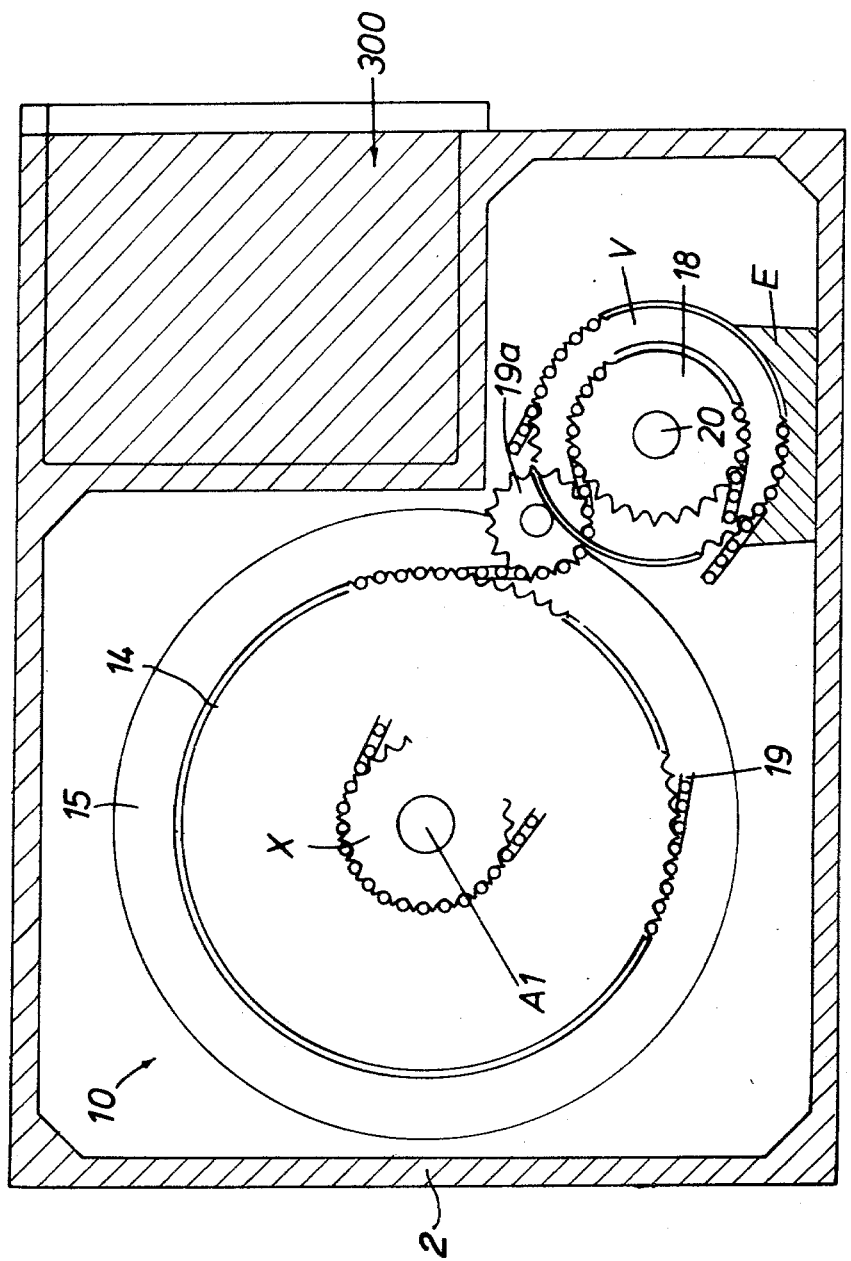
FIG. 6 is a view taken in the same plain as line 4A—4A of FIG. 3 but showing a modification of the present invention which includes a reversal drive means.

In FIG. 6 a reversal drive means 112 is schematically illustrated comprising a first sprocket wheel 114 fixedly secured to the casing 2 of the transmission unit 200 so that the sprocket 114 rotates in unison with the input shaft (not shown) of the transmission unit.

The first sprocket wheel 114 is arranged to drive a second sprocket wheel 118 via a chain 119. The first sprocket wheel 114 is larger than the second sprocket wheel in order to provide a step up in drive.

A tensioning sprocket wheel 19a is provided for tensioning chain 119. The second sprocket wheel 118 is mounted on the drive shaft 120 of the hydraulic pump E via a clutch 118a (FIG. 8). The drive shaft 120 is normally driven by sprocket wheel V which in turn is driven by sprocket wheel X.

When reversal of the output shaft A1 is desired, the clutch 118a is activated by an actuating means 118b (FIG. 8) so that the drive shaft 120 is driven at a speed faster than the input shaft. Consequently the sprocket wheel X is driven at a speed faster than the input shaft thus causing reversal in the direction of rotation of the output shaft. In order to enable the drive shaft 120 to be driven at a high speed, the actuating means are also arranged to simultaneously vent the fluid output of the hydraulic pump via means indicated diagramatically at 118d to remove resistance to rotation of the drive shaft.

Figure 7:
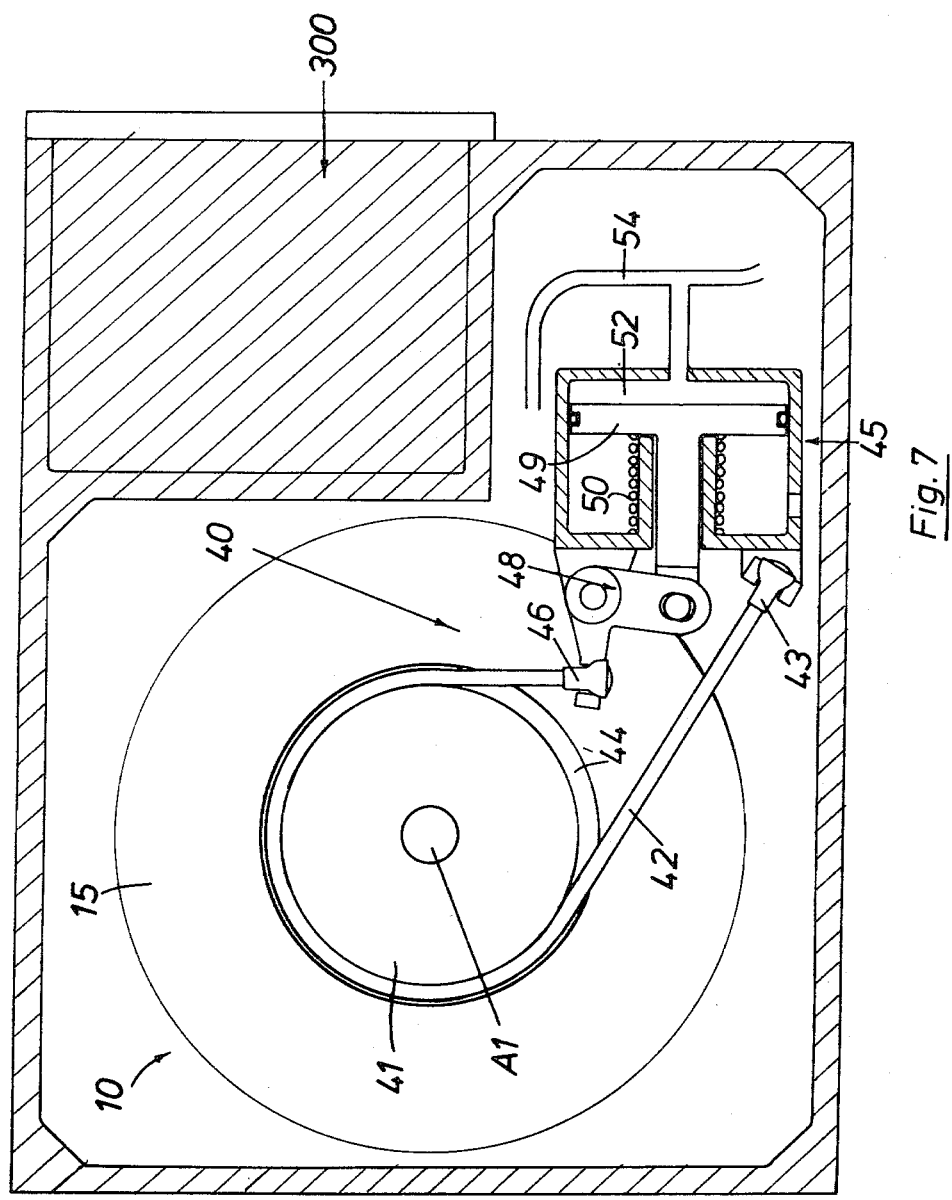
FIG. 7 is an end view taken from the right side of FIG. 3, but modified to show a brake means.

In FIG. 7, a brake means 40 is shown including a braking wheel 41 fixedly secured to the output shaft A1 and about which extends a brake band 42 made of steel cord.

The wheel 41 has a circumferentially extending groove 44 of "V" shaped cross-section for receiving the band 42. One end 43 of the band 42 is secured to the casing of a piston and cylinder assembly 45 and the other end 46 is connected to a pivotally mounted lever 48. The lever 48 is acted upon by the piston 49.

The piston 49 is biased by a spring 50 to an operative position whereat it deflects the lever 48 to thereby tighten the band to effect braking of the output shaft A1.

Pressurised fluid is fed to the piston cylinder 52 from the hydraulic pump E via pipe 54 and this pressurised fluid normally holds the piston in an inoperative position (as shown) so that the band loosely extends about the wheel 41.

It will be appreciated that when the brake means 40 and the reversal driven means 112 are used in combination, then the reversal actuating means 118b is arranged to simultaneously physically lock the piston 49 in its inoperative position during reversal via means, indicated digrammatically at 118c in FIG. 8.

The above transmission assembly when incorporating the reversal drive means 12 and brake means 40 in combination is particularly useful for use as a hoisting drive since it provides controlled lift and lowering functions and also provides a safety feature in that the brake means automatically operates should the pump E fail.

What we claim is:

1. A transmission assembly comprising an input shaft, an output shaft in co-axial alignment with the input shaft, a drive sprocket wheel carrying member secured to the input shaft and extending generally radially therefrom, a first sprocket wheel co-axially mounted on the output shaft, a second sprocket wheel rotatably mounted on the output shaft, at least one drive sprocket wheel assembly rotatably mounted on the sprocket wheel carrying member, each drive sprocket where assembly including at least a primary and secondary sprocket wheel, and for each drive sprocket wheel assembly, a chain extending about the primary sprocket wheel and the first sprocket wheel and a further chain extending about the secondary sprocket wheel and the second sprocket wheel, and control means for controlling the speed of the rotation of the second sprocket wheel to control the speed of rotation of the output shaft, and reversal drive means providing a step up driving connection between the input shaft and said second sprocket wheel via a clutch, so that when said clutch is activated the second sprocket wheel is rotated faster than the input shaft to effect reversal of the output shaft.

2. A transmission assembly comprising an input shaft, an output shaft in co-axial alignment with the input shaft, a drive gear carrying member secured to the input shaft and extending generally radially therefrom, a first gear co-axially mounted on the output shaft, a second gear rotatably mounted on the output shaft, at least one drive gear assembly rotatably mounted on the gear carrying member, each gear assembly providing a driving connection between the first and second gears, control means for controlling the speed of rotation of the output shaft and a reversal drive means for providing a step up driving connection between the input shaft and the second gear via a clutch, so that when said clutch is activated the second gear is rotated faster than the input shaft to effect reversal of the output shafts.

3. A transmission assembly according to claim 1 or 2 wherein the control means is an hydraulic pump, having a drive shaft, the second gear or second sprocket wheel being arranged to drive the drive shaft of the pump, flow of fluid through the pump being controlled by valve means to thereby control the rate of rotation of the drive shaft, the clutch being mounted on the drive shaft and the reversal drive means being arranged to drive said drive shaft via said clutch, and actuation means being provided for activating the clutch, the actuation means also serving to open the valve means on activating the clutch.

4. A transmission assembly according to claim 3 wherein the reversal drive means includes a sprocket, a sprocket wheel mounted on the drive gear or sprocket carrying member and a sprocket wheel mounted on said drive shaft via a clutch, a continuous chain providing a driving connection therebetween.

5. A transmission assembly according to claim 1 or 2 further including brake means co-operable with the output shaft for restraining rotation thereof.

6. A transmission assembly according to claim 5 wherein the brake means includes a wheel fixedly mounted on the output shaft, a brake band wrapped around the wheel and actuating means for tightening the band to grip the wheel.

7. A transmission assembly according to claim 6 wherein the wheel has a circumferentially extending groove of 'V' shaped cross-section and the band is arranged to wedge into the groove when the actuating means is actuated.

8. A transmission assembly according to claim 6 or 7 wherein the actuating means is controlled by pressurised fluid, the pressurised fluid being supplied by the hydraulic pump, the arrangement being such that the actuating means is actuated when the fluid output pressure of the pump is a predetermined minimum.

9. A transmission assembly according to claim 8 wherein the actuating means includes a piston connected to the brake band and biased to an operative position by resilient means, the piston being acted upon and normally held in an inoperative position by fluid pressure supplied by the hydraulic pump.

10. A transmission assembly comprising an input shaft, an output shaft in co-axial alignment with the input shaft, a drive sprocket wheel carrying a member secured to the input shaft and extending generally radially therefrom, a first sprocket wheel co-axially mounted on the output shaft, a second sprocket wheel rotatably mounted on the output shaft, at least one drive sprocket wheel assembly rotatably mounted on the sprocket wheel carrying member, each drive sprocket wheel assembly including at least a primary and secondary sprocket wheel, and for each drive sprocket wheel assembly, a chain extending about the primary sprocket wheel and the first sprocket wheel and a further chain extending about the secondary sprocket wheel and the second sprocket wheel, and control means for controlling the speed of the rotation of the second sprocket wheel to control the speed of rotation of the output shaft, and brake means co-operable with the output shaft for restraining rotation thereof.

11. A transmission assembly comprising an input shaft, an output shaft in co-axial alignment with the input shaft, a drive gear carrying member secured to the input shaft and extending generally radially therefrom, a first gear co-axially mounted on the output shaft, a second gear rotatably mounted on the output shaft, at least one drive gear assembly rotatably mounted on the gear carrying member, each gear assembly providing a driving connection between the first and second gears, control means for controlling the speed of rotation of the second gear to control the speed and rotation of the output shaft, and brake means co-operable with the output shaft for restraining rotation thereof.

* * * * *